United States Patent
Grant et al.

(10) Patent No.: US 9,919,655 B2
(45) Date of Patent: Mar. 20, 2018

(54) UNDER SEAT CAPTURE DEVICE

(71) Applicant: Toyota Motor Engineering & Manufacturing North America, Inc., Erlanger, KY (US)

(72) Inventors: Cassandra R. Grant, Saline, MI (US); Jonathan C. Hall, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/013,038

(22) Filed: Feb. 2, 2016

(65) Prior Publication Data
US 2017/0217376 A1    Aug. 3, 2017

(51) Int. Cl.
*B60R 7/04* (2006.01)
*B60N 2/46* (2006.01)

(52) U.S. Cl.
CPC ............ *B60R 7/043* (2013.01); *B60N 2/4686* (2013.01)

(58) Field of Classification Search
CPC .............................. B60R 7/043; B60N 2/4686
USPC ....................................... 296/37.14
See application file for complete search history.

(56) References Cited

U.S. PATENT DOCUMENTS

| 8,056,970 B1 | 11/2011 | Phillips |
| 8,282,161 B1 * | 10/2012 | Jacobson ............. B60N 2/6009 224/275 |
| 2007/0241581 A1 * | 10/2007 | Martin ..................... B60N 3/00 296/37.8 |
| 2009/0127882 A1 | 5/2009 | Thibodeau |
| 2011/0266820 A1 | 11/2011 | Hurwitz |
| 2015/0076872 A1 | 3/2015 | Carithers et al. |

FOREIGN PATENT DOCUMENTS

CN            204161175        2/2015

* cited by examiner

*Primary Examiner* — Joseph D. Pape
*Assistant Examiner* — Dana D Ivey
(74) *Attorney, Agent, or Firm* — Dinsmore & Shohl LLP

(57) ABSTRACT

Embodiments of an under seat capture device are described. Some embodiments include a first chute for aligning below a gap between a center console and a vehicle seat, a first platform component that is coupled to the first chute for receiving an object, and an actuator that is coupled to the first platform component that causes a change in position of the first platform component to guide the object received by the first platform component to a desired location.

19 Claims, 6 Drawing Sheets

UNDER SEAT CAPTURE DEVICE

TECHNICAL FIELD

Embodiments described herein generally relate to an under seat capture device and, more specifically, to a device for capturing objects that fall between a console and a vehicle seat or between a vehicle seat and a door.

BACKGROUND

Users of vehicles often drop small objects, such as mobile phones, change, and other items between the front console and a front seat of a vehicle or between the front seat and a door of the vehicle. When this occurs, the objects are often difficult to retrieve, especially when the vehicle is in motion. Thus, a need exists in the industry.

SUMMARY

Embodiments of under seat capture device are described. Some embodiments include a first chute for aligning below a gap between a center console and a vehicle seat, a first platform component that is coupled to the first chute for receiving an object, and an actuator that is coupled to the first platform component that, when actuated, causes a change in position of the first platform component to guide the object received by the first platform component to a desired location.

In another embodiment, an under seat capturing system includes a first chute for aligning below a first gap between a center console and a vehicle seat, a second chute for aligning below a second gap between a vehicle door and the vehicle seat, and a first platform component that is coupled to the first chute and the second chute for receiving an object from at least one of the following: the first chute and the second chute. Some embodiments include a first receiving tray that is coupled to the first platform component, where the first receiving tray comprises a vertical wall to restrict the object from leaving the first receiving tray.

In yet another embodiment, a vehicle includes a center console that defines a first gap between the vehicle seat and the center console, a vehicle door that defines a second gap between the vehicle seat and the vehicle door, and an under seat capture device. Embodiments of the under seat capture device include a first chute for aligning below the first gap, a second chute for aligning below the second gap, and a first platform component that is coupled to the first chute and the second chute for receiving an object. In some embodiments, the under seat capture device includes a first receiving tray that is coupled to the first platform component, where the first receiving tray comprises a vertical wall to restrict the object from leaving the first receiving tray and an actuator that is coupled to the first platform component that causes a change in position of the first platform component to guide the object received by the first platform component to a desired location.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include an under seat capture device. Some embodiments may include an integrated chute, platform component, and receiving tray that are installed under the passenger or driver seat in a vehicle. The under seat capture device may be installed under a vehicle seat and may be configured such that an object dropped between the center console and the vehicle seat or between the vehicle seat and a vehicle door will be directed into a more accessible region.

Accordingly, the under seat capture device may have a curved and/or finned pattern to direct items into the chute. Additionally, some embodiments may have an actuator that may be engaged to further direct objects into the guides. Some embodiments may have an actuator in the form of a lever or a motorized option that may be engaged to further direct objects into the chutes and, more specifically to an accessible area of the vehicle. Embodiments of the under seat capture device incorporating the same will be described in more detail, below.

Figure 1:
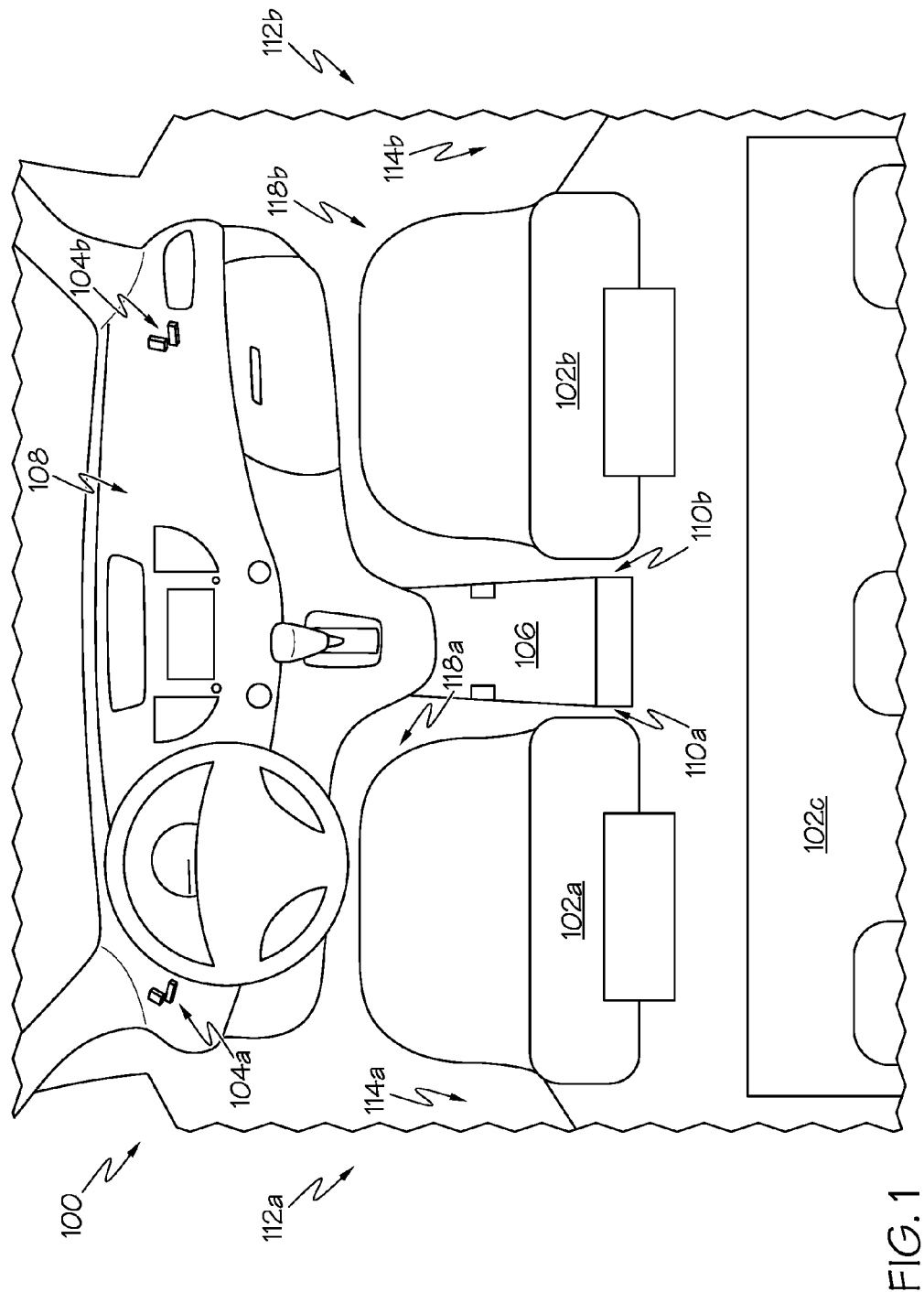
FIG. 1 depicts a vehicle interior, illustrating areas where objects may become inaccessible, according to embodiments described herein.

Referring now to the drawings, FIG. 1 depicts a vehicle interior 100, illustrating areas where objects may become inaccessible, according to embodiments described herein. As illustrated, the vehicle interior 100 may include a first vehicle seat 102a, such as a driver seat, and a second vehicle seat 102b, such as a passenger seat. A third vehicle seat 102c may also be included as one or more back seats. The vehicle seats 102a, 102b, 102c may be configured as bucket seats, bench seats, or other types of seats and may be movable in any of a plurality of different directions. In some embodiments, the vehicle seats 102 may be moveable via a manual lever for reclining, changing vertical position, changing horizontal position, tilting, changing a lumbar adjustment, etc. In some embodiments, the vehicle position may be adjusted electronically via the seat adjustment controls 104a, 104b.

Also depicted in the vehicle interior 100 is a center console 106. The center console 106 may extend from a dash portion 108, between the first vehicle seat 102a and the second vehicle seat 102b and may terminate around a back portion of the vehicle seats 102a, 102b. The center console 106 may be configured for storing objects within and may also provide an arm rest to a driver and passenger in the first vehicle seat 102a and second vehicle seat 102b.

While the center console 106 may provide storage and comfort features, the presence of the center console 106 and the ability for movement of the first vehicle seat 102a and the second vehicle seat 102b oftentimes results in a first gap (e.g., gap 110a, gap 110b). The gap 110a includes the space between the first vehicle seat 102a and the center console 106. The gap 110b includes the space between the second vehicle seat 102b and the center console 106. Unfortunately for many drivers and passengers, objects such as mobile phones, change, papers, and the like may fall into one of the gaps 110a, 110b from which the object may be difficult to retrieve.

Similarly, space between the first vehicle seat 102a and a vehicle door 112a (driver side) may create a second gap (e.g., gap 114a) into which objects may become trapped. Space between the second vehicle seat 102b and the vehicle door 112b (passenger side) may create yet another gap 114b into which objects may become trapped. Objects that become trapped are often difficult to retrieve, especially during operation of the vehicle.

Also depicted in FIG. 1 are a first central space 118a and a second central space 118b, which are areas under the vehicle seats 102. Parts of the central spaces 118a, 118b may be more accessible because there is often access to the central spaces 118a, 118b from the front and/or back of the vehicle seats 102a, 102b.

Figure 2:
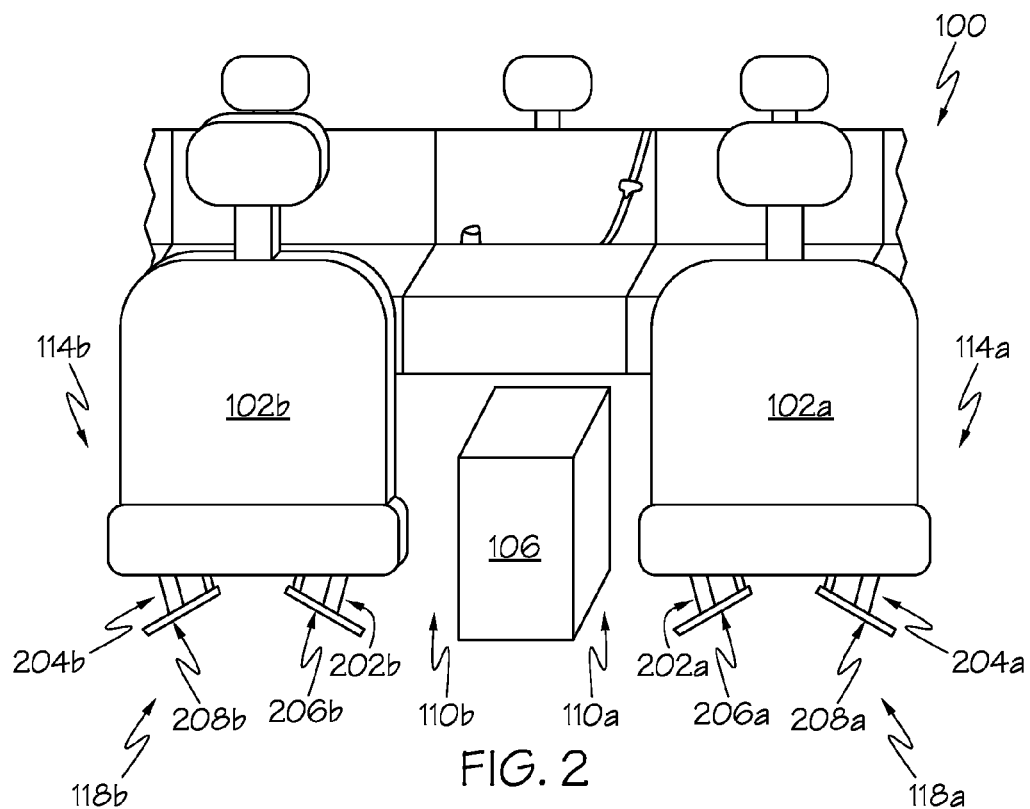
FIG. 2 depicts another perspective view of the vehicle interior, further illustrating an under seat area, according to embodiments described herein.

FIG. 2 depicts another perspective view of the vehicle interior 100, further illustrating an under seat area, according to embodiments described herein. As illustrated, the first vehicle seat 102a may be supported by legs 202a, 204a, which are connected to rails 206a, 208a, respectively. Similarly, the second vehicle seat 102b is supported by legs 202b, 204b, which are connected to rails 206b, 208b. As described above, the vehicle seats 102a, 102b are movable and thus move along the rails 206a, 208a and 206b, 208b. As a consequence, objects that fall into the gap 110a often cannot find the more accessible area of the first central space 118a because the rail 206a often prevents movement from the gap 110a to the first central space 118a. Objects that fall into the gap 114a often cannot find the more accessible area of the first central space 118a because of rail 208a. Objects that fall into gap 110b often cannot find the more accessible area of the second central space 118b because of the rail 206b. Similarly, objects that fall into gap 114b often cannot find the more accessible area of the second central space 118b because of the rail 208b.

As a consequence, embodiments of the under seat capture device described herein may be installed in the first central space 118a (or the second central space 118b for the second vehicle seat 102b). These embodiments may extend over the rails 206a, 206b, 208a, 208b to allow objects to find the more accessible area of the central space 118a, 118b. Additionally, some embodiments may be coupled to the legs 202a, 204a such that the under seat capture device may move with the first vehicle seat 102a (or second vehicle seat 102b).

Figure 3A:
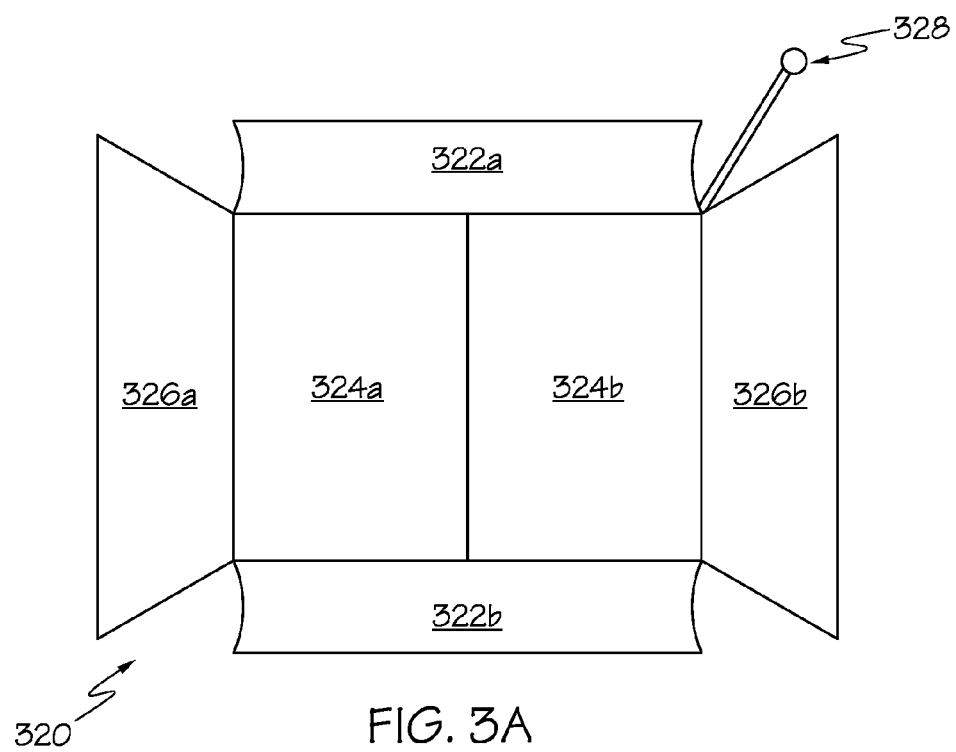
FIGS. 3A-3C depict an under seat capture device for capturing otherwise inaccessible objects in the vehicle interior, according to embodiments described herein.
Figure 3B:
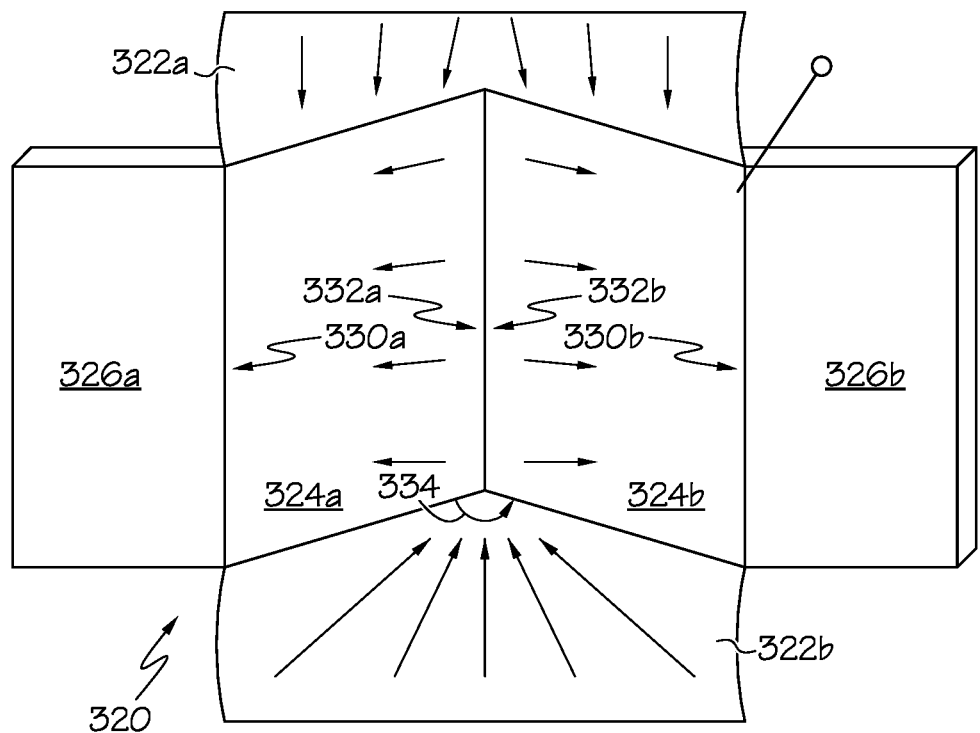
Figure 3C:
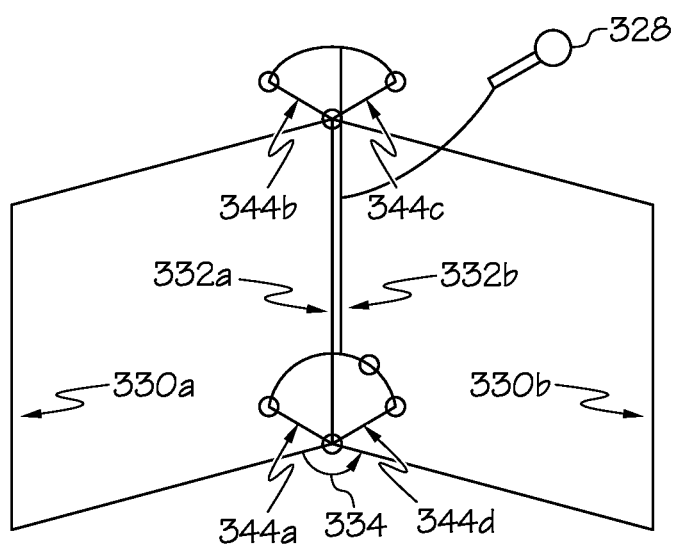

FIGS. 3A-3C depict an under seat capture device 320 for capturing otherwise inaccessible objects in the vehicle interior, according to embodiments described herein. As illustrated in FIG. 3A, the under seat capture device 320 may include a first chute 322a, a second chute 322b, a first platform component 324a, a second platform component 324b, a first receiving tray 326a, a second receiving tray 326b, and an actuator 328. The chutes 322a, 322b may receive an object that has fallen between the vehicle seat 102a, 102b and the center console 106 or between the vehicle seat 102a, 102b and the vehicle door 112a, 112b. As illustrated, the chutes 322a, 322b may be curved such that an edge of one of the chutes 322a, 322b contacts or otherwise creates a tight tolerance with the center console 106 or vehicle door 112a, 112b. Thus, when an object falls between the center console 106 and the vehicle seat 102a, 102b (or between the vehicle door 112a, 112b and the vehicle seat 102a, 102b), the chute 322a, 322b may receive the object without obstruction.

As illustrated, the chutes 322a, 322b may be curved and/or angled to direct the object into one or more of the platform components 324a, 324b. In some embodiments, the chutes 322a, 322b may be angled to allow gravity to direct objects received by the chutes 322a, 322b toward the platform components 324a 324b. Similarly, some embodiments may be configured with the chutes 322a, 322b hinged and/or detachable with the platform components 324a, 324b. Further, some embodiments may be configured such that the chutes 322a, 322b are raised from the platform components 324a, 324b to create a vertical wall that restricts objects received by the platform components 324a, 324b from reentering the chutes 322a, 322b.

Coupled to the chutes 322a, 322b are the platform components 324a, 324b. The platform components 324a, 324b may be placed in the central space 118a, 118b (FIG. 1, 2), with the chutes 322a, 322b extending to be substantially below a space between the center console 106 and the vehicle seat 102a, 102b (e.g., the gaps 110a, 110b). When an object is received by one of the chutes 322a 322b, the platform components 324a, 324b may keep the object in the central space 118a, 118b and/or may further direct the object to one of the receiving trays 326a, 326b. The platform components 324a, 324b may be hinged together, such that a change in relative angle or a change in position between the first platform component 324a and the second platform component 324b may be implemented. In some embodiments, the angle may change from about 180 degrees to about zero degrees. However, some embodiments may be limited by overhead space provided by the vehicle seat 102a, 102b.

Additionally, some embodiments of the platform components 324a, 324b may be configured with ridges, fins, or other guiding features that reduce an object's ability to return to the chutes 322a, 322b, but direct the object to the receiving trays 326a, 326b. As an example, fins may extend from the platform components 324a, 324b that are directed substantially parallel with the intersection between the chutes 322a, 322b and the platform components 324a, 324b. Thus, objects on the platform components 324a, 324b are provided physical incentive to move to the receiving trays 326a, 326b, as opposed to the chutes 322a, 322b.

It should be understood that while some embodiments are configured to direct objects received by either of the chutes 322a, 322b into the receiving trays 326a, 326b, this is just an example. Some embodiments may be configured to allow objects received by the second chute 322b (e.g. the chute closest to the vehicle door 112a, 112b) to remain in the second chute 322b. As an example, the area between the first vehicle seat 102a and the vehicle door 112a may be large enough for a driver or passenger to retrieve the object from that location. As such, the second chute 322b may include a vertical wall that restricts objects from leaving the second chute 322b. Similarly, some embodiments may be configured to direct at objects located at predetermined areas of the platform components 324a, 324b to the second chute 322b. In these embodiments, the platform components 324a, 324b may have an elevated region that directs objects located close to the second chute 322b into the second chute 322b, while directing objects residing elsewhere to the receiving trays 326a, 326b.

Also depicted in FIG. 3A are the receiving trays 326a, 326b. The first receiving tray 326a may be positioned under the first vehicle seat 102a (for example), but toward the front of the first vehicle seat 102a to provide access of objects that reach the first receiving tray 326a from the in front of the first vehicle seat 102a. Similarly, the second receiving tray 326b may be positioned under the first vehicle seat 102a, but toward the back of the first vehicle seat 102a to provide access to objects that reach the second receiving tray 326b from behind the first vehicle seat 102a. In some embodiments, the receiving trays 326a, 326b may be hinged and/or detachable from the platform components 324a, 324b.

Additionally, some embodiments may be configured such that the elevation of the platform components 324a, 324b is greater than at least a portion of the receiving trays 326a, 326b, creating an effective vertical wall such that objects received by the receiving tray 326a, 326b cannot easily return to the platform components 324a, 324b or chutes 322a, 322b. In still some embodiments, the receiving trays 326a, 326b have a vertical wall on each side to restrict objects from escaping the receiving trays 326a, 326b, but the receiving trays 326a, 326b are coupled to the platform components 324a 324b such that the platform components 324a, 324b have a higher elevation at the coupling to allow objects to easily move from the platform components 324a, 324b to the receiving trays 326a, 326b.

It should also be understood that, while the receiving trays 326a, 326b are depicted as being trapezoidal in shape, this is also just an example. In some embodiments, at least one of the receiving trays 326a, 326b is substantially rectangular, substantially round, or other geometric or non-geometric shape. Similarly, some embodiments are configured with the receiving trays 326a, 326b being coupled to the chutes 322a, 322b so that objects that become directed from the chutes 322a, 322b directly to the receiving trays 326a, 326b are also captured. Further, while the receiving trays 326a, 326b are depicted in FIG. 3A as being substantially flat, some embodiments may be configured with the receiving trays 326a, 326b including vertical walls to restrict objects that are received by the receiving trays 326a, 326b from exiting.

Also depicted in FIG. 3A is the actuator 328. The actuator 328 may be configured as a manual actuator and/or as a motorized actuator and thus may include a lever, pulley, selectable button, etc., as described in more detail below. Regardless, the actuator 328 may cause the relative angle 334 (FIG. 3B) between the first platform component 324a and the second platform component 324b to change, thereby directing objects to the receiving trays 326a, 326b or other predetermined location. In some embodiments, the actuator 328 may also change the relative angle between the chutes 322a, 322b and the platform components 324a, 324b to change, thereby guiding the object from the chutes 322a, 322b to the platform components 324a, 324b. In still some embodiments, the actuator 328 may cause a vibration and/or other actuation that further directs the objects to the desired location.

FIG. 3B depicts a change in configuration of the under seat capture device 320 to direct objects to a desired location, according to some embodiments described herein. As illustrated, when the actuator 328 is actuated, the exterior sides 330a, 330b of the platform components 324a, 324b, which are coupled to the receiving trays 326a, 326b are forced more closely together, thereby causing a bend in the hinge at the interior sides 332a, 332b. This causes the relative angle 334 between the first platform component 324a and the second platform component 324b to decrease, thereby allowing gravity to force objects on the platform components 324a, 324b to the respective receiving trays 326a, 326b.

In some embodiments, a second actuator may be included (or the first actuator may perform a plurality of functions) to first guide objects in the chutes 322a, 322b to the platform components 324a, 324b. Upon actuating the second actuator, the relative angle or relative position between the chutes 322a, 322b and the platform components 324a, 324b may change to allow gravity to guide the objects to the platform components 324a, 324b. As an example, one or more of the chutes 322a, 322b may rotate toward the platform components 324a, 324b and/or the chutes 322a, 322b may remove the concave arc to a flat or convex arc. Regardless, once the object has reached the platform components 324a, 324b, actuation of the platform components 324a, 324b may be performed to guide the objects from the platform components 324a, 324b to the receiving trays 326a, 326b.

As will be understood, when the relative angle 334 between the first platform component 324a and the second platform component 324b changes, a gap may be created between the chutes 322a, 322b and the platform components 324a, 324b. As such, some embodiments may be configured with netting between the chutes 322a, 322b and the platform components 324a, 324b. Some embodiments may be configured such that the chutes 322a, 322b are hinged with and bend similarly as the platform components 324a, 324b.

FIG. 3C depicts functionality of the actuator 328 in more detail, according to embodiments described herein. As illustrated, when the actuator 328 is engaged, a cable system 344a, 334b, 344c, 344d that is coupled to a hinge between the first platform component 324a and the second platform component 324b may pull interior sides 332a, 332b vertically, thereby causing the relative angle 334 between the first platform component 324a and the second platform component 324b to change. This may operate similar to a bicycle brake, however this is just an example.

Similarly, other embodiments may include motorized actuation such that the exterior sides 330a, 330b are pushed together to actuate the platform components 324a, 324b. In these embodiments, a button or other electronic input device may be utilized to facilitate actuation. Additionally, vibration may be utilized to further guide objects to the desired locations.

It should also be understood that that while the platform components 324a, 324b are depicted as two planar components that rotate around a hinge to move an object, this is just an example. In some embodiments, the platform component 324a, 324b is a single solid piece. When an object reaches the solid platform component, the angle of the platform component 324 relative to the floor of the vehicle changes to guide the object to the desired location. In some of these embodiments this change in position of the solid platform component may utilize a base component that the solid platform component is connected to guide the object. The base component may be hinged to the solid platform component or the solid platform component may be placed on the base component, with the base component centered to allow tilting of the base component in any desired direction.

Figure 4A:
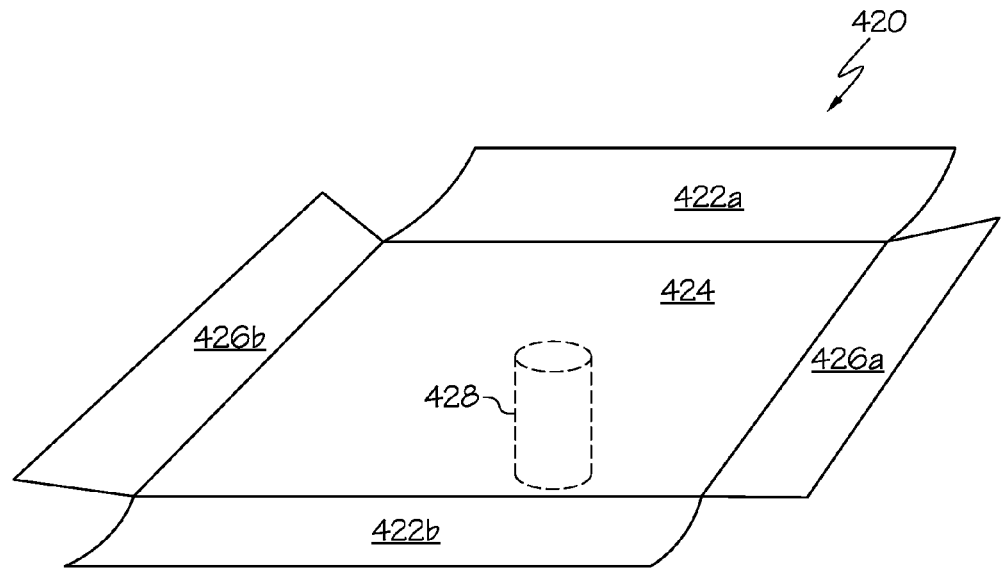
FIGS. 4A-4B depict an under seat capture device that utilizes a solid platform component to guide objects to a desired location, according to embodiments described herein.
Figure 4B:
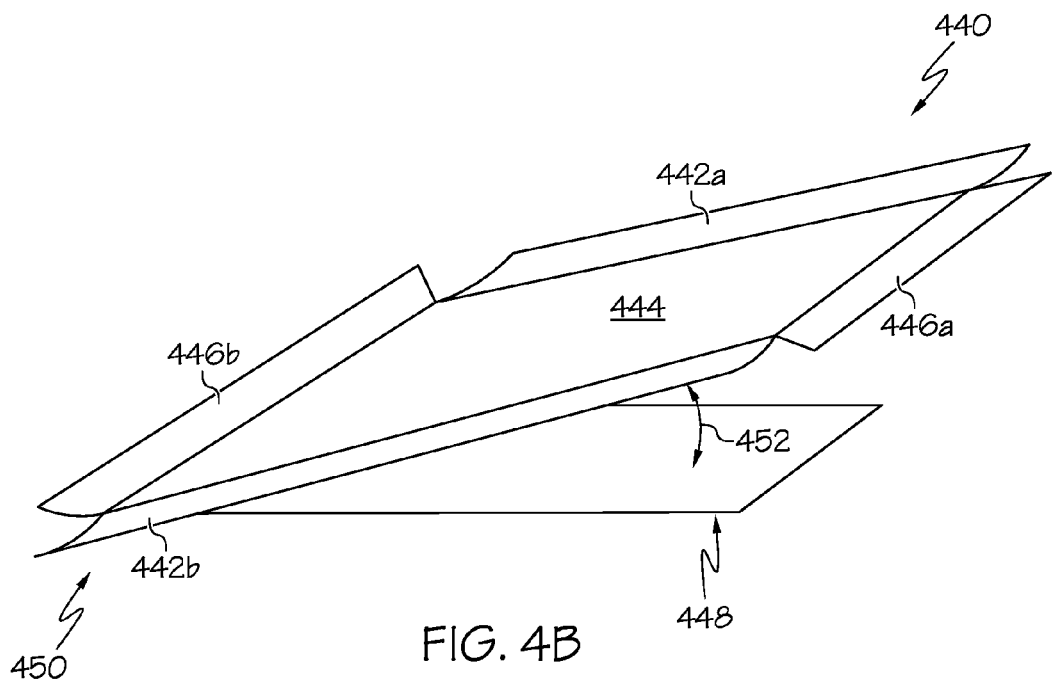

FIGS. 4A-4B depict an under seat capture device 420, 440 that utilizes a solid platform component 424, 444 to guide objects to a desired location, according to embodiments described herein. As illustrated in FIG. 4A, the under seat capture device 420 may include chutes 422a, 422b and receiving trays 426a, 426b. However, depicted in FIG. 4A is a solid platform component 424. While the platform components 324a, 324b from FIGS. 3A-3C are configured to change position through a change in relative angle 334, the solid platform component 424 is coupled to a base component 428. The base component 428 may be constructed of flexible material and/or be configured for mechanical manipulation to change the position of the solid platform component 424 to guide objects to the desired location. As such, the base component 428 may be configured for bending in 360 degrees for directing the object in a plurality of directions. Some embodiments may be configured with sensors on the solid platform component 424, which detect the presence and location of an object. Based on the location of the object, the base component 428 may bend to change the position of the solid platform component 424 to guide the object to the desired location.

Accordingly, embodiments described herein, whether with a solid platform component or dual platform components, may additionally include a computing device that is coupled to sensors for identifying the presence and current location of the object. The computing device may be part of the human machine interface (HMI) of the vehicle and/or may include a separate computing device. Based on the current location of the object, the computing device may provide a command to the actuator 328 (FIG. 3A) for guiding the object to the desired location.

FIG. 4B similarly depicts an under seat capture device 440, which includes chutes 442a, 442b and receiving trays 446a, 446b. Also included is a solid platform component 444, which is coupled to a base component 448 via a hinge 450 on one side of the solid platform component 444 for directing the object in a single direction. Thus, when the actuator 328 is engaged, a spring, lever, motor, or other device may cause a change in position of the solid platform component 444 to enlarge an angle 452 relative to the base component 448, thereby guiding an object to the desired position.

Figure 5A:
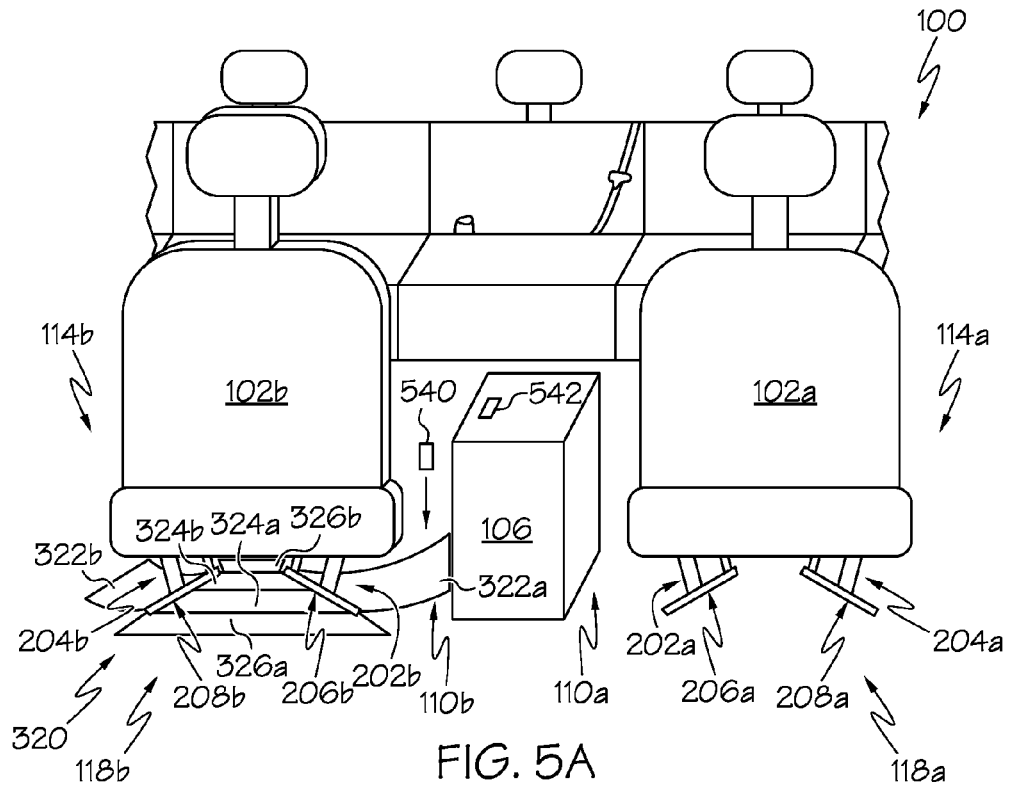
FIGS. 5A-5C depict an under seat capture device with an object captured, according to embodiments described herein.
Figure 5B:
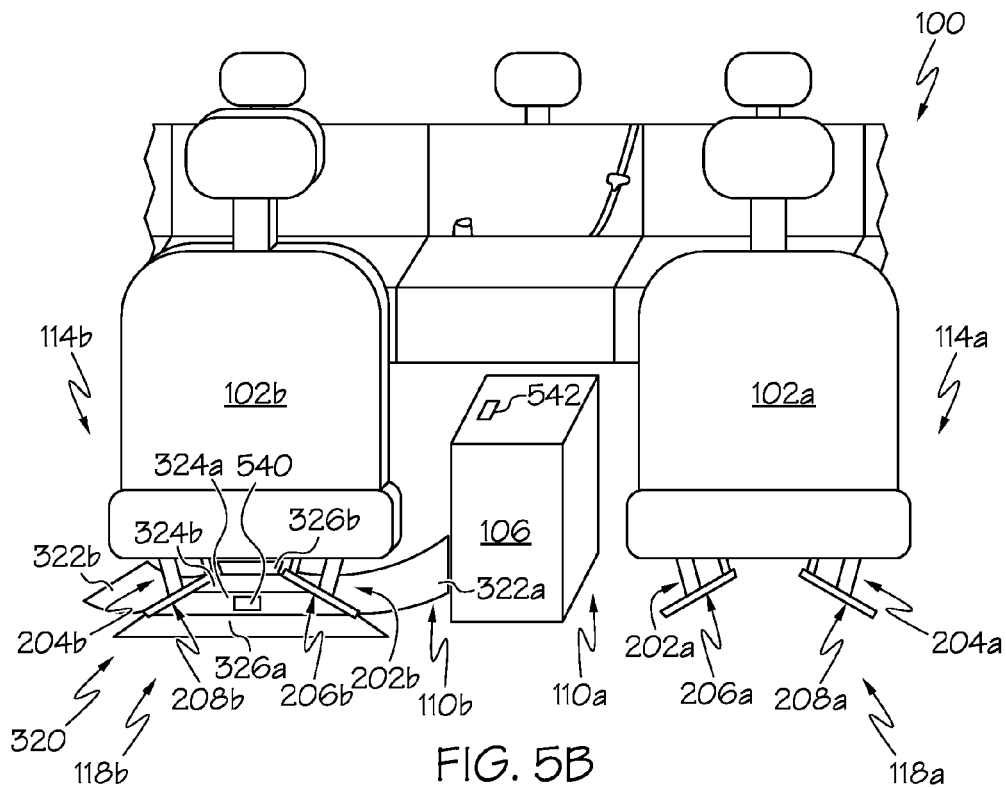
Figure 5C:
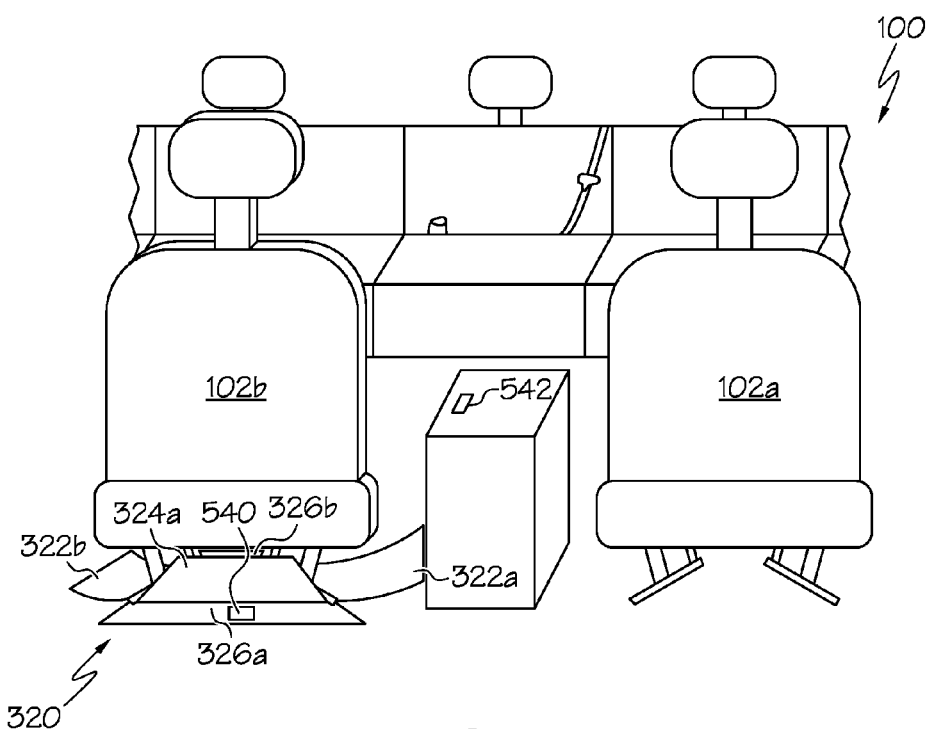

FIGS. 5A-5C depict an under seat capture device 320 with an object 540 captured, according to embodiments described herein. As illustrated in FIG. 5A, the under seat capture device 320 is positioned under the second vehicle seat 102b. The under seat capture device 320 may be coupled to an underside of the second vehicle seat 102b and/or to the legs 202b, 204b. This configuration allows the under seat capture device 320 to move with the second vehicle seat 102b, if the user implements any seat adjustments. As also depicted, the chutes 322a, 322b are positioned in the gaps 110b, 114b to receive the object 540 that falls between the center console 106 and the vehicle seat 102b (or between the vehicle door 112b and the vehicle seat 102b).

When the object 540 is received in the first chute 322a, the curved or angled configuration of the first chute 322a may direct the object 540 to the platform components 324a, 324b. If the object 540 does not automatically move from the first chute 322a to the platform components 324a, 324b, the actuator 542 may be engaged, which causes a vibration or other movement of the first chute 322a that further guides the object 540 to the platform components 324a, 324b. In some embodiments, the actuator 542 causes the first chute 322a to change the relative angle with the platform components 324a, 324b to guide the object 540 to the platform components 324a, 324b.

It should also be understood that, while the actuator 542 may be engaged to move the object 540 from the first chute 322a to the platform components 324a, 324b or from the platform components 324a, 324b to the receiving trays 326a, 326b, this is just an example. Some embodiments may be configured with one or more sensors (e.g., weight sensors, laser sensors, etc.) on the under seat capture device 320 that detect the presence of the object 540. Based on the current location of the object 540 on the under seat capture device 320 and the desired location of the object 540, the under seat capture device 320 may automatically reconfigure as described herein to guide the object 540 to the desired location.

FIG. 5B depicts embodiments of the under seat capture device 320, with the object 540 being directed to the first platform component 324a from the first chute 322a. As discussed above, the first chute 322a may be shaped and positioned to guide the object 540 to the first platform component 324a. With the object 540 on the first platform component 324a, the actuator 542 may be engaged to alter the relative position or the relative angle 334 (FIG. 3B) between the first platform component 324a and the second platform component 324b to guide the object 540 to the first receiving tray 326a (or to the second receiving tray 326b, depending on the location of the object 540.

FIG. 5C depicts embodiments of the under seat capture device 320, with the object 540 being directed to the first receiving tray 326a. As discussed above, the object 540 may be guided to the first receiving tray 326a (or other desired location) by a change in the relative angle 334 between the first platform component 324a and the second platform component 324b. As an example, when the actuator 542 is engaged, the relative angle 334 may begin to change. The relative angle 334 may continue to change until a sensor in the first receiving tray 326a detects receipt of the object 540. Once the object 540 is received at the first receiving tray 326a, the under seat capture device 320 may return to its original position. Additionally, if the under seat capture device 320 detects that the object 540 is not progressing to the desired location through change in the relative angle 334, the under seat capture device 320 may implement vibration or other mechanisms to further guide the object 540 to the desired location.

It will be understood that while the embodiment of FIGS. 5A and 5B depict an under seat capture device 320 being installed under the second vehicle seat 102b, this is merely an example. The under seat capture device 320 may be installed under the first vehicle seat 102a and/or a modified version of the under seat capture device 320 may be installed under the first vehicle seat 102a to fit the opposite configurations between the first vehicle seat 102a and the second vehicle seat 102b.

As illustrated above, various embodiments of the under seat capture device are disclosed. By utilizing the under seat capture device, objects that are dropped between a center console and a vehicle seat or between a vehicle door and a vehicle seat may be easily retrieved.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes embodiments of an under seat capture device. It should also be understood that these embodiments are merely exemplary and are not intended to limit the scope of this disclosure.

What is claimed is:

1. An under seat capture device comprising:
a first chute for aligning below a gap between a center console and a vehicle seat;
a second chute for aligning below a second gap between a vehicle door and the vehicle seat;
a first platform component that is coupled to the first chute and the second chute for receiving an object from at least one of the following: the first chute and the second chute;
a first receiving tray that is coupled to the first platform component for receiving the object from the first platform component, wherein the first receiving tray comprises a vertical wall to restrict the object from leaving the first receiving tray; and an actuator that is coupled to the first platform component that causes a change in position of the first platform component to guide the object received by the first platform component to a desired location.

2. The under seat capture device of claim 1, further comprising a second platform component that is coupled to the first platform component at an interior side to create a relative angle between the first platform component and the second platform component, wherein the first platform component and the second platform component alter the relative angle to guide the object to the first receiving tray.

3. The under seat capture device of claim 1, further comprising:
a sensor that detects a presence and a current location of the object on the under seat capture device; and
a computing device that is coupled to the sensor and the actuator, wherein the computing device stores logic for determining the desired location for the object, and based on the current location of the object, sending a command to the actuator to guide the object to the desired location.

4. The under seat capture device of claim 1, further comprising a base component that is coupled to the first platform component.

5. The under seat capture device of claim 4, wherein the base component is coupled to an interior side of the first platform component for tilting the first platform component in a plurality of directions.

6. The under seat capture device of claim 4, wherein the base component is coupled to an exterior side of the first platform component for tilting the first platform component in a single direction.

7. An under seat capture system comprising:
a vehicle seat; and
an under seat capture device that is coupled to the vehicle seat, the under seat capture device comprising:
a first chute for aligning below a first gap between a center console and the vehicle seat;
a second chute for aligning below a second gap between a vehicle door and the vehicle seat;
a first platform component that is coupled to the first chute and the second chute for receiving an object from at least one of the following: the first chute and the second chute; and
a first receiving tray that is coupled to the first platform component, wherein the first receiving tray comprises a vertical wall to restrict the object from leaving the first receiving tray.

8. The system of claim 7, further comprising:
a second platform component that is coupled to the first platform component at an interior side; and
a second receiving tray that is coupled to the second platform component.

9. The system of claim 7, further comprising an actuator that is coupled to the first platform component that causes a change in position of the first platform component to guide the object received by the first platform component to a desired location.

10. The system of claim 9, wherein the actuator includes at least one of the following: a manual actuator and a motorized actuator.

11. The system of claim 9, further comprising:
a sensor that detects a presence and a current location of the object on the system; and
a computing device that is coupled to the sensor and the actuator, wherein the computing device stores logic for determining the desired location for the object, based on the current location of the object and for sending a command to the actuator to guide the object to the desired location.

12. The system of claim 7, further comprising a base component that is coupled to the first platform component, wherein the base component is coupled to an interior side of the first platform component for tilting the first platform component in a plurality of directions.

13. The system of claim 7, further comprising a base component that is coupled to the first platform component, wherein the base component is coupled to an exterior side of the first platform component for tilting the first platform component in a single direction.

14. A vehicle, comprising:
a vehicle seat;
a center console that defines a first gap between the vehicle seat and the center console;
a vehicle door that defines a second gap between the vehicle seat and the vehicle door; and
an under seat capture device comprising:
a first chute for aligning below the first gap;
a second chute for aligning below the second gap;
a first platform component that is coupled to the first chute and the second chute for receiving an object;
a first receiving tray that is coupled to the first platform component, wherein the first receiving tray comprises a vertical wall to restrict the object from leaving the first receiving tray; and
an actuator that is coupled to the first platform component that causes a change in position of the first platform component to guide the object received by the first platform component to a desired location.

15. The vehicle of claim 14, further comprising:
a second platform component that is coupled to the first platform component at an interior side; and
a second receiving tray that is coupled to the second platform component.

16. The vehicle of claim 15, further comprising:
a sensor that detects a presence and a current location of the object on the under seat capture system; and
a computing device that is coupled to the sensor and the actuator, wherein the computing device stores logic for determining the desired location for the object, based on the current location of the object and for sending a command to the actuator to guide the object to the desired location.

17. The vehicle of claim 14, further comprising a base component that is coupled to the first platform component, wherein the base component is coupled to an interior side of the first platform component for tilting the first platform component in a plurality of directions.

18. The vehicle of claim 14, further comprising a base component that is coupled to the first platform component, wherein the base component is coupled to an exterior side of the first platform component for tilting the first platform component in a single direction.

19. The vehicle of claim 14, wherein the actuator includes at least one of the following: a manual actuator and a motorized actuator.

* * * * *